A. G. & A. J. THOMPSON.
CORN PLANTER.
No. 23,126. Patented Mar. 1, 1859.
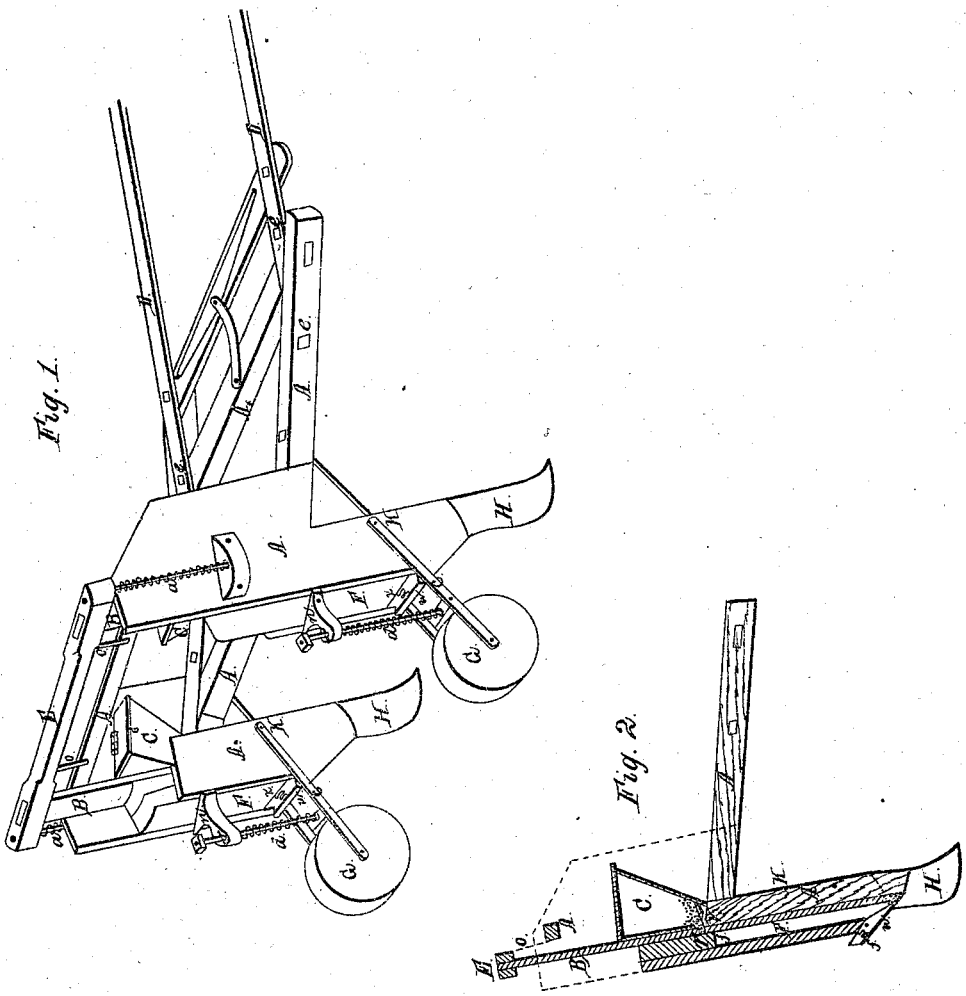
Witnesses.
Abraham Lash
Reuben Evarts
Inventor.
Amos G. Thompson
A. J. Thompson

UNITED STATES PATENT OFFICE.

AMOS G. THOMPSON AND ANDREW J. THOMPSON, OF BELLVILLE, OHIO.

IMPROVEMENT IN CORN-PLANTERS.

Specification forming part of Letters Patent No. 23,126, dated March 1, 1859.

*To all whom it may concern:*

Be it known that we, AMOS G. THOMPSON and ANDREW J. THOMPSON, of Bellville, in the county of Richland and State of Ohio, have invented a new and useful Machine for Planting Corn and other Seeds; and we do hereby declare that the following is a full, clear, and exact description of the construction and operation of the same, reference being had to the annexed drawings, making part of this specification, in which—

Figure 1 is a perspective view. Fig. 2 is a detached section.

A A, Fig. 1, is the main frame, to which shafts D D are permanently attached by bolts *e e e*.

C C are seed-hoppers attached to the upright side pieces of the main frame.

B B are plungers passing down behind the seed-hoppers, which plungers are passed downward by the operator pressing on the cross-bar E, by means of which motion the seed is separated from the bulk of seed in the hopper and passed through the aperture through the plungers into the seed-chambers F F, as illustrated in Fig. 2, which cross-bar and plungers are thrown back to their proper position by spiral springs *a a*, and held in position by means of said springs and straps *o o*.

G G are gage and covering wheels, attached to main frame by stirrups *c c*, which wheels are operated upon by means of spiral springs *d d*, the operation of which springs, in conjunction with the permanent attachment of the shafts to the draft-animal and the pressure of the hand of the operator upon the main frame, are designed to regulate the depth of the shares H H, and at the same time gather and slightly press the loose earth into the furrow and cover the seed. It is also designed to use those wheels as a truck-carriage to carry the machine from field to field, &c. This is done by sliding the metal bolts passing through spiral springs *d d* downward and placing the adjusting-pin below the fastening *n n* to main frame. This operation places the wheels below the shares in such a manner as to prevent them from coming in contact with the earth.

To mark out the field before checking and planting, take off the wheels G G, spiral springs *d d*, and stirrups *c c* by detaching said stirrups from the main frame at their fastening-bolts K K; then take off cross-bar E, plungers B B, and spiral springs *a a* by detaching straps *o o* that button on main frame, and the machine is ready for use for that purpose.

Fig. 2 is a detached section, of which T is a square cavity passing through the plunger B, through which cavity, when the plunger passes downward, the seed passes into the seed-chamber F, and is there retained by the valve W, which is adjusted by spiral springs X, until said plungers return again downward, and the lower end of said plunger, coming in contact with said deposited seed and valve, forces the valve open and deposits the seed in the furrow, and the seed for another hill is deposited in the chamber by said downward motion, and so on at each succeeding movement of said plunger.

V is a brush attached to the top of the upright piece of the main frame, which forms the bottom of the seed-hopper, designed to regulate the distribution of the seed and prevent the seed obstructing the movement of the plunger in its passage downward. This brush is let into a cavity cut into the top of said upright piece, and secured to its place by glue, and a wooden or metal plate fastened over the same and secured by nails or screws. The end of the brush should be cut square and extend out, so as to slightly brush the side of the plunger, and should in all cases be made as wide as the issuing-cavity through the plunger.

*f* is a gage in the plunger, designed for regulating the desired quantity of seed, which gage is secured and regulated by a screw.

We claim—

The arrangement of spiral springs *a a*, in combination with cross-bar E and straps *o o*, for regulating the movement of the plungers B B, substantially as specified.

AMOS G. THOMPSON.
A. J. THOMPSON.

Witnesses:
REUBEN EVARTS,
ABRAHAM LASH.